United States Patent
Allen

[19]

[11] Patent Number: 5,795,665
[45] Date of Patent: Aug. 18, 1998

[54] FUEL CELL SUB-ASSEMBLY WITH A PLURALITY OF DIMPLES

[75] Inventor: Jeffrey Allen, Naugatuck, Conn.

[73] Assignee: Energy Research Corporation, Danbury, Conn.

[21] Appl. No.: 698,439

[22] Filed: Aug. 19, 1996

[51] Int. Cl.$^6$ ............... H01M 2/18; H01M 8/04; H01M 8/02

[52] U.S. Cl. .............. 429/12; 429/34; 429/38; 429/39; 429/143

[58] Field of Search .................. 429/39, 38, 34, 429/143, 30, 12

[56] References Cited

U.S. PATENT DOCUMENTS

| | | | |
|---|---|---|---|
| 3,746,578 | 7/1973 | Warszawski | 136/86 R |
| 4,702,973 | 10/1987 | Marianowski | 429/41 |
| 4,983,472 | 1/1991 | Katz et al. | 429/38 |
| 5,049,458 | 9/1991 | Sato et al. | 429/32 |
| 5,169,731 | 12/1992 | Yoshimura et al. | 429/30 |
| 5,175,062 | 12/1992 | Farooque et al. | 429/20 |
| 5,227,256 | 7/1993 | Marianowski et al. | 429/16 |
| 5,232,792 | 8/1993 | Reznikov | 429/14 |

OTHER PUBLICATIONS

Article entitled "Understanding of Carbonate Fuel Cell Resistance Issues for Performance Improvement", Contract #DE–AC21–90MC27168, 1992 (No Month).
Article entitled "Development of Internal Reforming Catalysts for the Direct Fuel Cell" by Tarjanyi, et al., 1985 Fuel Cell Seminar, Tucson, Ariz., May 19–22, pp. 177–181.

Primary Examiner—John S. Maples
Attorney, Agent, or Firm—Robin, Blecker & Daley

[57] ABSTRACT

A fuel cell sub-assembly having a cathode current collector, a cathode electrode, an electrolyte matrix, an anode electrode and an anode current collector arranged in a sandwich construction and provided with a plurality of rows of dimples. Adjacent rows of dimples extend in opposite directions from the sandwich construction and separator plates also with rows of dimples are arranged adjacent to the sandwich construction so as to form therewith channels for the fuel and oxidant gases. Also disclosed are unique separator plate configurations.

4 Claims, 6 Drawing Sheets

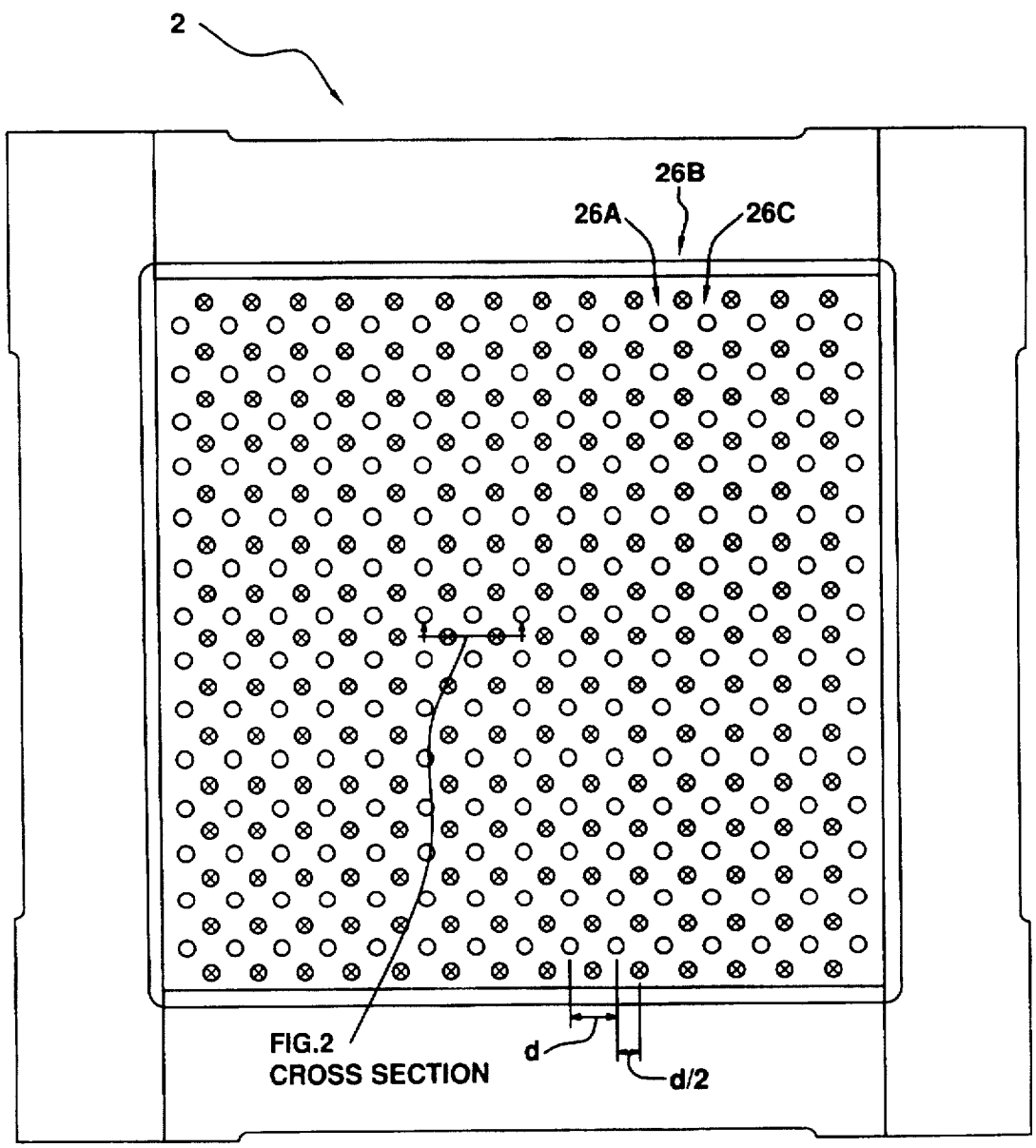

FUEL CELL SUB-ASSEMBLY WITH A PLURALITY OF DIMPLES

BACKGROUND OF THE INVENTION

This invention relates to fuel-cell sub-assemblies comprised of stacked or sandwiched components and, in particular, to improvements in these sub-assemblies.

High temperature fuel cell stacks, such as, for example, carbonate fuel cell stacks, comprise a plurality of vertically arranged planar active components. These components include anode and cathode electrodes separated by an electrolyte component which typically has the form of a densely packed bed of ceramic powder, referred to as a matrix. An electrolyte, as, for example, a carbonate, resides in the pores of the electrolyte component, and during operation, the electrolyte also lies within the pores of the electrodes, and facilitates the well known fuel cell reaction.

The sandwiched arrangement of electrodes and electrolyte component form a fuel-cell sub-assembly. In the fuel cell stack, these sub-assemblies are electrically connected in series to provide a fuel cell stack having a desired output voltage.

A separator plate is positioned between successive sub-assemblies and acts as a means of sealing the reactant fuel cell gases from each other and from the atmosphere. Each separator plate may be part of an adjacent fuel cell sub-assembly and is fitted with a corrugated sheetmetal structure to support the components of the sub-assembly uniformly across the length and width of each side of each separator plate. The corrugated structure also serves to provide height to the passages, required at each electrode, for the fluid flow of the reactant gases. The corrugated sheetmetal and the separator plate together form a current flow path for the electrons liberated in the fuel cell reaction.

The electrodes and the electrolyte matrix of the fuel cell sub-assembly have traditionally been manufactured and installed in planar sheet-like form as taught in U.S. Pat. No. 4,983,472. Typical manufacturing methods include dry doctored and tape casting. It is common practice to precondition the electrodes prior to installation in the fuel cell sub-assembly. The cathode electrode, which typically might comprise porous, nickel, is normally sintered and oxidized, and in some cases loaded with electrolyte, during the manufacturing process. The anode electrode, which also might typically include porous nickel, is normally sintered and in some cases loaded with electrolyte during the manufacturing process. This preconditioning contributes significantly to the cost of the fuel cell sub-assembly.

U.S. Pat. No. 3,746,578 teaches the application of an "embossed or goffered electrode having protuberances extending from both sides" of an electrode. This design utilizes a flat ionic membrane where only the extremities of the protuberances make electrical contact with the flat ionic membrane. This technique is not suited to molten carbonate fuel cells where the frangible electrodes and electrolyte matrix (ionic membrane) must be maintained in intimate contact with each other and with the current collectors. Furthermore, the pattern described by U.S. Pat. No. 3,746,578 would likely produce high back pressure at the flow rates experienced by the molten carbonate fuel operating with high current density flow rates due to the tight spacing and low height of the flow field. In addition, the "protuberances" described do not possess a flat area in the peak of each protuberance which limits electronic contact area.

As previously discussed, the separator plate used with each fuel cell sub-assembly is fitted with a corrugated sheetmetal structure. This has been achieved in the past in various ways. The simplest approach is to employ an independently corrugated sheetmetal component to form the required gas passages and support the active components as taught in the aforementioned '472 patent. However, this approach significantly increases the height and weight of each sub-assembly, which is an important factor when considering tall fuel cell stacks of 250+ fuel cell sub-assemblies.

Another common method involves the corrugation of the actual separator plate itself as taught in U.S. Pat. No. 5,232,792. This method reduces the height and weight of the fuel cell sub-assembly, and it eliminates a number of metallic interfaces, thus, improving electronic resistance. A third method is simply a combination of the latter two methods.

U.S. Pat. No. 5,049,458 teaches the application of concave and convex portions to the separator plate to comprise a "wave-form", or dimpled corrugation pattern to create the gas flow chambers of the fuel cell. However, this design relies upon "flat-plate" electrodes and electrolyte layer thus limiting the pitch distance of the pattern to that which the un-reinforced flat-plate solid electrolyte may be expected to bridge. The dimples on the separator of the '458 patent are shown as being hemispherical and tangentially contact the flat-plate electrode at a curved portion of the dimples. Furthermore, the flat plate solid electrolyte assembly does not contribute to increased cross-sectional flow area. In addition, the design requires it be coupled with additional structure to create the sealing frame. This additional structure adds to manufacturing complexity and cost.

All of these methods suffer from some drawbacks. As previously noted, a planar separator plate with an independently corrugated sheetmetal component possesses unnecessary bulk and mass, while an integrally corrugated separator plate typically requires additional sheetmetal structure, comprised of independent pieces, welded to the central separator sheet in order to form the required peripheral sealing structure commonly referred to as the wet seal. Typically, the amount of welding is significant and is subject to corrosion and failure in addition to the cost of applying the weld.

The poor mechanical properties of the electrodes together with the compressive sealing load requirements of the composite fuel cell sub-assembly require that the electrode support spans defined by the corrugations of the corrugated structure be kept small so that the electrodes are properly supported. Additionally, the short unsupported spans of the electrodes, together with the demands of low fluid flow back pressure, necessitate a corrugation height which is inconsistent with the ability to easily draw the sheetmetal in standard forming dies during manufacture. Consequently, compromises are forced upon the designer and the entire separator support system becomes limited with respect to contact area to the electrodes, cell height, and back pressure.

As above-stated, the electrolyte for the fuel cell sub-assembly is stored in the electrolyte component. The electrolyte component may be either a separately cast component as taught in U.S. Pat. No. 5,227,256 or, combined with one or both of the electrodes. As the electrolyte melts, the mechanical properties of each fuel cell sub-assembly and, therefore, the composite stack are radically altered. This often results in height changes of the fuel cell stack during start-up. Height changes in the stack, in turn, result in increased manifold seal leakage for externally manifolded systems and imposes the requirement of factory conditioning of internally manifolded systems where the electrolyte is installed in tape cast form.

In order to improve the efficiency of the fuel cell sub-assembly, it is common to locate catalyst directly in the assembly. The catalyst permits use of methane as the primary fuel gas which is cracked to its constituent elements and combined with water to achieve the desired gas composition. The catalyst is highly porous and tends to absorb electrolyte through various mechanisms. Catalyst contaminated by electrolyte loses efficiency. This effect is described in a paper entitled, "Development of Internal Reforming Catalysts for the Direct Fuel Cell", by Michael Tarjani, Lawrence Paetsch, Randolf Bernard, Hossein Ghezel-Ayagh, 1985 Fuel Cell Seminar, Tucson, Ariz., May 19–22. Pgs. 177–181.

A common method of avoiding catalyst contamination is disclosed in U.S. Pat. No. 5,175,062 where the catalyst is placed in an enclosed chamber, isolated from the electrolyte and distributed every five to ten cells throughout the stack. This technique is effective but reduces the beneficial effect of the endothermic reforming reaction and results in unnecessary thermal gradients within the stack. U.S. Pat. No. 4,702,973 teaches a method of safely locating catalyst directly within each sub-assembly by utilizing a hydrogen-ion porous membrane to create two separate anode gas compartments. However, this technique relies on the use of ribbed anode electrodes which is highly uneconomical.

During operation of the fuel cell sub-assembly stack, current output is limited by several factors. Ohmic resistance is the most significant limiting factor. Ohmic resistance is created by each sub-assembly component and by the interface between each sub-assembly. This is described in a DOE Report "Understanding of Carbonate Fuel Cell Resistance Issues for Performance Improvement" Contract #DE-AC21-90MC27168. Further limitations are imposed by the available electrode surface area and by the back pressure created as the gases flow through each cell. Large current output requires high flow rates which result in increased back pressure. High back pressures tend to contribute to reactant gas leakage which reduces efficiency and may accelerate corrosion.

It is, therefore, an object of the present invention to provide a fuel cell sub-assembly which overcomes the disadvantages discussed above.

It is a further object of the present invention to provide a fuel cell sub-assembly in which broad span electrode support is realized with integration of the gas passages of the assembly.

It is yet a further object of the present invention to provide a fuel cell sub-assembly having increased surface area and reduced contact resistance.

It is still a further object of the present invention to provide a fuel cell sub-assembly requiring a reduced electrolyte inventory, reduced compressive load requirements and providing reduced pressure drop.

It is a further object of the present invention to provide a separator with improved sealing for a fuel cell sub-assembly.

SUMMARY OF THE INVENTION

In accordance with the principles of the present invention, the above and other objectives are realized in a fuel cell sub-assembly comprising anode and cathode electrodes, an electrolyte component and anode and cathode current collectors. These elements are sandwiched together in a sequence of anode current collector, anode electrode, electrolyte component, cathode electrode and cathode current collector, to form the composite fuel cell sub-assembly. The composite sub-assembly is further provided with rows of dimples formed such that the dimples in successive rows protrude in opposite directions from the assembly.

First and second separator plates are provided in abutting relationship to opposite faces, respectively of the composite sub-assembly. Each separator plate is also formed with rows of dimples such that the dimples in successive rows protrude from the separator plate in opposing directions. The first separator plate abuts a first face of the sub-assembly so that the dimples of the plate protruding in a first direction abut the dimples of the sub-assembly protruding in the opposite or second direction. Similarly, the second separator plate abuts a second face of the sub-assembly so that the dimples of the second separator plate protruding in the second direction abut the dimples of the sub-assembly protruding in the first direction. This results in the needed support of the sub-assembly and the integration of the gas flow passages for the sub-assembly with the separator plates.

In a further aspect of the present invention, catalyst is situated in the cavities formed by the dimples protruding in the first direction from the separator plates. Gas barrier members are then situated on the dimples of the separator plates protruding in the second direction. This establishes a dual anode chamber for the fuel cell assembly.

In yet a further aspect of the present invention, a separator plate is provided having first and second opposing side areas and third and fourth opposing side areas which are uniquely adapted to provide sealing of the oxidant gases from the fuel gases.

BRIEF DESCRIPTION OF THE DRAWINGS

The above and other features and aspects of the present invention will become more apparent upon reading the following detailed description in conjunction with the accompanying drawings, in which:

FIG. 3 shows a plan view of one of the fuel cell sub-assemblies of FIG. 2;

DETAILED DESCRIPTION

Figure 1:
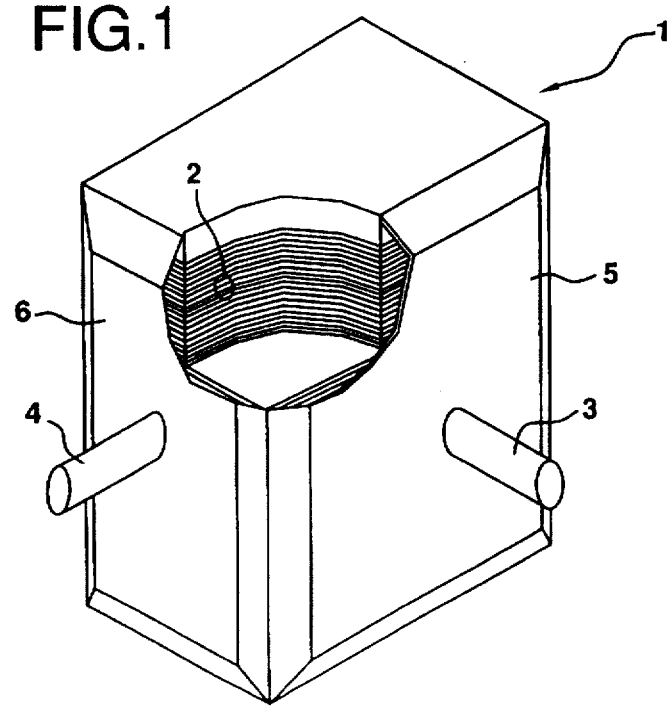
FIG. 1 illustrates a stack of fuel cell sub-assemblies in accordance with the principles of the present invention.

In FIG. 1, a fuel cell stack 1 comprised of a number of fuel cell sub-assemblies 2 is shown. As illustrated, the stack includes oxidant and fuel gas input conduits 3 and 4 and input manifolds 5 and 6 for carrying oxidant and fuel gas to the sub-assemblies 2.

Figure 2:
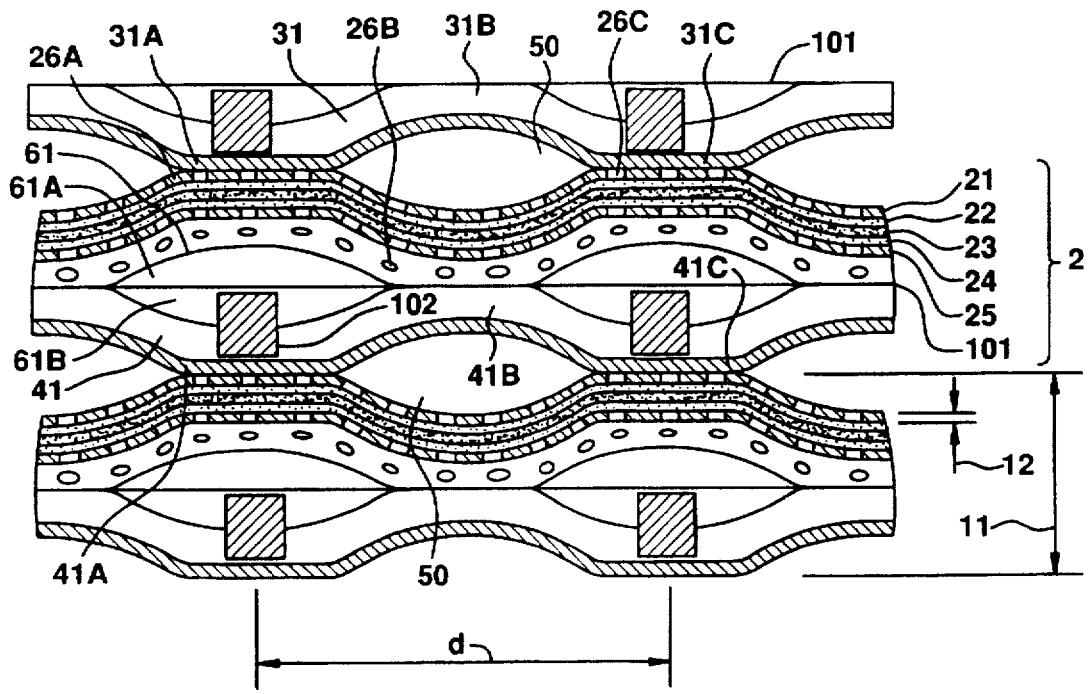
FIG. 2 shows a partial cross-section of adjacent fuel cell sub-assemblies of the stack of FIG. 1.

As can be seen in the cross-sectional view in FIG. 2, each sub-assembly 2 includes a cathode current collector 21, a cathode electrode 22, an electrolyte matrix 23, an anode electrode 24 and an anode current collector 25. These elements are sandwiched together to form the composite sub-assembly 2.

In accordance with the invention, the formation and sandwiching of the elements 21–25 to create the sub-assembly 2 is such that the sub-assembly includes a plurality of rows of dimples 26A, 26B, 26C, . . . which extend through thicknesses of the elements 21–25. The dimples in a given row extend in the same outward direction from the body of the sub-assembly, while the dimples in successive rows extend in opposite directions and are off-set from one other.

In FIG. 2, the dimples 26A in a first row extend in a first or upward direction, while the dimples 26B in the next row extend in a second or downward direction. The dimples 26C in the next succeeding row, in turn, extend in a first or upward direction. Succeeding rows of dimples (not shown) then extend in the second direction (downwardly) and then in the first direction (upwardly) in succession in proceeding from one row to the next.

The rows of dimples 26A, 26B, 26C, . . . are, moreover, offset longitudinally one from the other. This is shown more clearly in the plan view of the sub-assembly 2 shown in FIG. 3. As can be seen, the distance between successive dimples in a row (measured between peaks) is equal to the value d. The longitudinal offset distance between successive rows of dimples (also measured between peaks), in turn, is equal to d/2.

Each fuel cell sub-assembly 2 abuts at its opposite faces, i.e., at its cathode current collector 21 and anode current collector 25, first and second separator plates 31 and 41, respectively. The separator plates 31 and 41 each also have successive rows of dimples. As with the fuel cell sub-assembly 2, the dimples in each row of a separator plate extend in the same direction, while the dimples in successive rows extend in opposite directions and are off-set from each other.

As shown, the first separator plate 31 has rows of dimples 31A, 31B, 31C, . . . with the direction of the dimples alternating from row-to-row, starting with a second or downward direction for the row 31A. Similarly, the separator plate 41 has rows of dimples 41A, 41B, 41C, . . . , also with the direction of the dimples alternating from row-to-row, starting with a second or downward direction for one row 41A.

As with sub-assembly 2, the peak-to-peak spacing of the dimples in each row of the separator plates 31 and 41 is equal to the distance d. The off-set distance between successive rows of dimples for each plate, in turn, is equal to the distance d/2.

As shown in FIG. 2, the separator plate 31 abuts the cathode current collector 21 of the sub-assembly 2 such that the rows of dimples of the plate 31 extending in the second direction (downwardly) (rows 31A, 31C, . . . ) contact the rows of dimples of the sub-assembly 2 extending in the opposite or the first direction (upwardly) (rows 26A, 26C, . . . ). The separator plate 41, in turn, abuts the anode current collector 25 such that the rows of dimples of the plate 41 extending in the first direction (upwardly) (41B, . . . ) contact the rows of dimples of the sub-assembly 2 extending in the second direction (downwardly) (26B, . . . ).

With the rows of dimples of the separator plates 31 and 41 abutting the rows of dimples of the sub-assembly 2 in the manner described above, the plates and sub-assembly form integrated oxidant gas passages 50 and integrated fuel gas passages 61. These passages carry the oxidant and fuel gases through the sub-assembly and these gases electrochemically interact with the sub-assembly components to generate electricity.

As can be appreciated, the integrated structure of the sub-assembly 2 and separator plates 31 and 41, coupled with the dimpled patterns used in these components, provides significant advantages. More particularly, use of the dimpled pattern in the sub-assembly 2, enhances the structural rigidity of the current collectors 21 and 25. This enables the current collectors to span the broader distances required when using the separators 31 and 41 to form the gas passages with the sub-assembly. Moreover, the gas passages can now be of sufficiently large cross-sectional flow area to permit high current density flow rates free from significant flow resistance.

In forming the sub-assembly 2, it is preferable to pre-form the cathode and anode current collectors 21 and 25 with the dimpled pattern. The current collectors may comprise perforated sheetmetal stock, expanded metal or wire cloth. The perforation pattern may vary in a limited range with respect to hole diameter and spacing.

Following the pre-forming of current collectors 21 and 25, the cathode 22 is vacuum formed or pressed to cathode current collector 21 which typically may be comprised of stainless steel. The matrix 23 is then vacuum formed or pressed to the cathode 22 supported on the cathode current collector 21. The anode 24, in turn, is vacuum formed or pressed to its anode current collector 25 which typically may be comprised of nickel.

The unitary structure of the anode 24 and anode current collector 25 is placed into a press along with the unitary structure of matrix 23, cathode 22 and cathode current collector 21 such that the dimple patterns are enmeshed or nested. The resultant assembly is pressed to final dimension to create the sub-assembly 2.

Molten carbonate electrodes and electrolyte matrices are poor structural components except when held in pure compression. The finely distributed support provided by the dimpled structure of the enmeshed current collectors of the sub-assembly 2 permits the use of thin "green" tape cast active components for the electrodes 22 and 24 and the matrix 23. Thin "green" tape cast electrodes and matrices are rigid in compression yet are pliable and formable to the dimpled structure. In short, with the sub-assembly 2 and its dimpled pattern, one can achieve integrated, large cross-sectional flow area, gas passages with broad-span support with thin "green" formable tape cast electrodes and matrices.

In the sub-assembly 2, the unsupported span is equal to the pitch or peak to peak spacing d of the dimples. Tests of sub-assemblies have been successfully completed for an unsupported span of 0.416 inches, but this span could range from perhaps 0.25 to 0.75 inches. The unsupported span may range further provided other design parameters are altered, primarily cell height and current collector thickness. Cell height 11 has been tested at 0.16 inches but may range from ~0.12 to 0.20 inches while current collector thickness 12 has been tested at 0.01 inches but may range from 0.005 to 0.020 inches. It should be noted that during assembly, the cathode electrode 22, matrix 23, and anode electrode 24 may be taken directly from a tape casting, or, dry doctor process so they are pliable, and uniquely suited to vacuum forming or pressing to non-planar geometries.

As mentioned above, each individual cell component of the sub-assembly 2 contributes to gas passage formation, yet the electrodes 22, 24 and matrix 23 are uniformly supported by the current collectors 21 and 25. It is apparent that the integration of the gas passages, and elimination of lazy planar components, contribute to reduction of cell height, thus increasing the volumetric power density of the fuel cell sub-assembly.

One can also see that the application of compressive sealing forces to the active sandwich of the sub-assembly 2 is held in uniform compression and that the internal lateral stresses generated in areas between the dimple to dimple contact areas will be compressive stresses due to the dome-like structure rather than tensile as happens with planar active components supported by corrugations. These factors contribute to an overall improvement in current collector/ electrode contact uniformity which dramatically improve sub-assembly ohmic resistance. Moreover, the field formed by the non-planar structure of the sub-assembly 2 permits high gas flow rates without significant back pressure, while the dimples form a pattern of connected chambers across the length and width of the flow field.

Figure 4A:
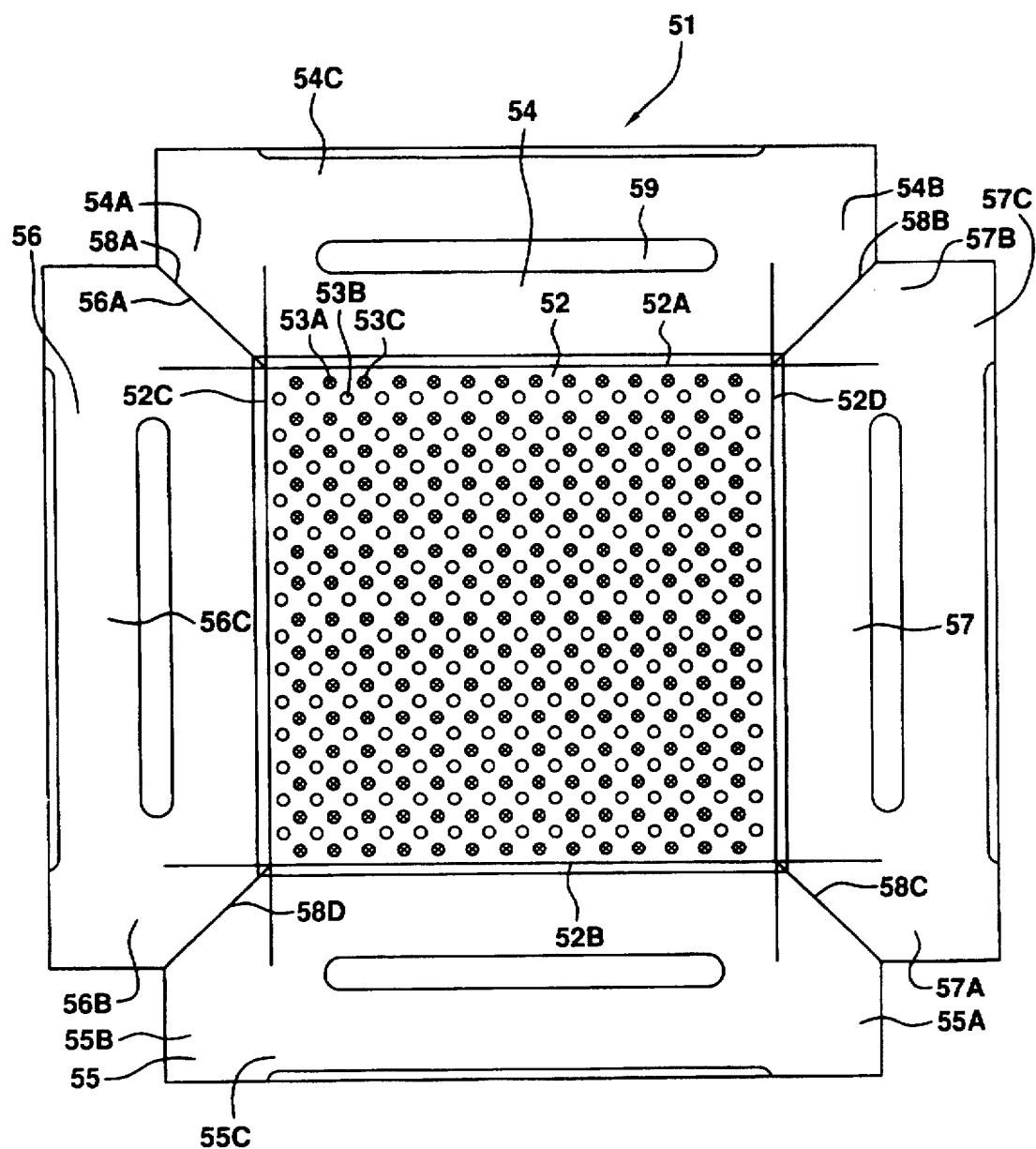
FIG. 4A shows a plan view of a separator plate which can be used for the fuel cell sub-assemblies of FIGS. 2 and 3.

FIG. 4A shows a plan view of a separator plate 51 which can be used for the separator plates 31 and 41 of the sub-assembly 2. The separator plate 51 includes a central area 52 which is formed to have successive rows of dimples 53A, 53B, . . . protruding from the plate. As described previously, successive rows of dimples protrude in opposing directions and are offset by one-half the peak to peak dimple distance d.

The separator plate 51 also includes opposing first and second wet seals or side areas 54 and 55 and opposing third and fourth side areas 56 and 57. The side areas 54 and 55 are drawn downwardly from the adjoining ends 52A and 52B of central area, while the side areas 55 and 56 are drawn upwardly from their respective adjoining ends 52C and 52D of the central area. This drawing creates side walls 58A-58D between the lateral ends of the side areas.

Thus, the side wall 58A connects the lateral end 56A and 54A of the side areas 56 and 54, the side wall 58B connects the lateral ends 54B and 57B of the side areas 54 and 57, the side wall 58C connects the lateral ends 57A and 55A of the side areas 57 and 55 and the side wall 58D connects the lateral ends 55B and 56B of the side areas 55 and 56. Each side wall 58A-58D extends for only a portion of the adjacent lateral ends and the lateral ends then extend beyond the wall at approximately 90 degrees relative to one another.

These extensions 54C-57C create flaps which can be bent to form upper chambers (in the case of extensions 54C and 55C) and lower chambers (in the case of extensions 56C and 57C) with the side walls 58A-58D. These chambers can be sealed from each other and from the outside environment by applying compressive forces to the flaps and opposing parts of the side areas of the plate. As a result, when the separator plate 51 is used for the separator plates in the sub-assemblies 2 of the stack 1 of FIG. 1, no welding is required to establish with each separator plate, the required sealed anode gas passages across the lower surface of the plate and the required sealed cathode gas passages across the upper surface of the plate.

Figure 4B:
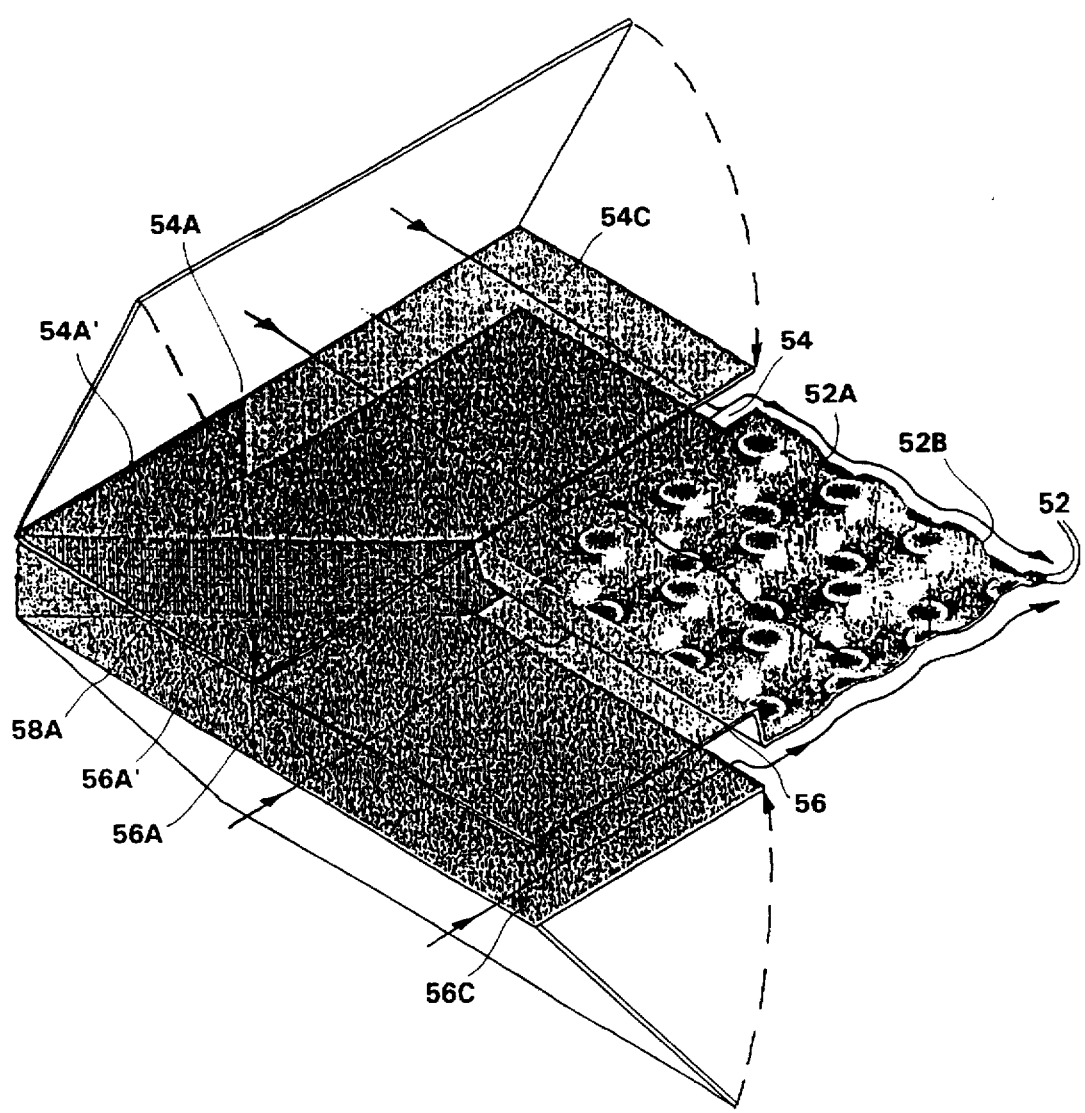
FIG. 4B illustrates the corner section of the separator plate of FIG. 4A showing the wet seal areas of the separator plate.

As previously stated, each of the flaps 54C-57C when bent contacts and forms a seal with the side walls at the lateral ends of its side area and with the triangular portions of the adjacent side areas. This can be best seen in FIG. 4B which shows the adjacent lateral ends 54A and 56A of the side areas 54 and 56. As shown, the flap or extension 54C of the side area 54 has been bent up and around so that it rests on the recessed triangular portion 56A' of the lateral end 56A of the side area 56 adjacent the wall 58A. The recessing of the triangular portion 56A' results in a flush surface at the junction of the flap 54C and side area 56A. Moreover, there is created an upper chamber feeding onto the top surface 52A of the central area 52 which is isolated by the wall 58A (and the wall 58B at the other lateral side) from the lower surface 52B of the central area 52.

Likewise, the flap or extension 56C of the side area 56 has been bent down and around so that rests on the recessed triangular portion 54A' of the lateral end 54A of side area 54 adjacent the wall 58A. This creates a lower chamber feeding onto the bottom surface 52B of the central area 52 which is isolated by the wall 58A (and the wall 58D of the other lateral side) from the upper surface 52A of the area 52.

With the flaps 55C and 57C bent similarly as the flaps 54C and 55C, respectively, like upper and lower chambers are formed by these flaps. In this way, as above-stated, when the separator plate 51 is used in a 10 sub-assembly 2 for the plates 31 and 41, the compressive forces on the flaps 54C to 57C resulting from the stacked sub-assemblies cause the chambers formed to be gas tight from each other and from the outside environment. Gas-tight side areas or wet seals are, therefore, formed by the plates without the need to weld any joints or inserts.

Accordingly, as also stated above, fuel gas can be carried to and from the top surface 52A of the central area 52 by the chambers formed by the flaps 54C and 55C and oxidant gas can be carried to and from the bottom surface 52B of the central area by the chambers formed by the flaps 56C and 57C in isolation from each other, and the outside environment, as is required for the fuel and oxidant fuel gas chambers of the sub-assembly 2. In the case of separator plate 51, the extensions 54C-57C of the side areas 54-57 are provided with lateral slots 59. When the flaps are bent, those slots become situated in end wall portions of the flaps to provide gas input and output ports for the sealed chambers formed by the flaps.

Figure 5:
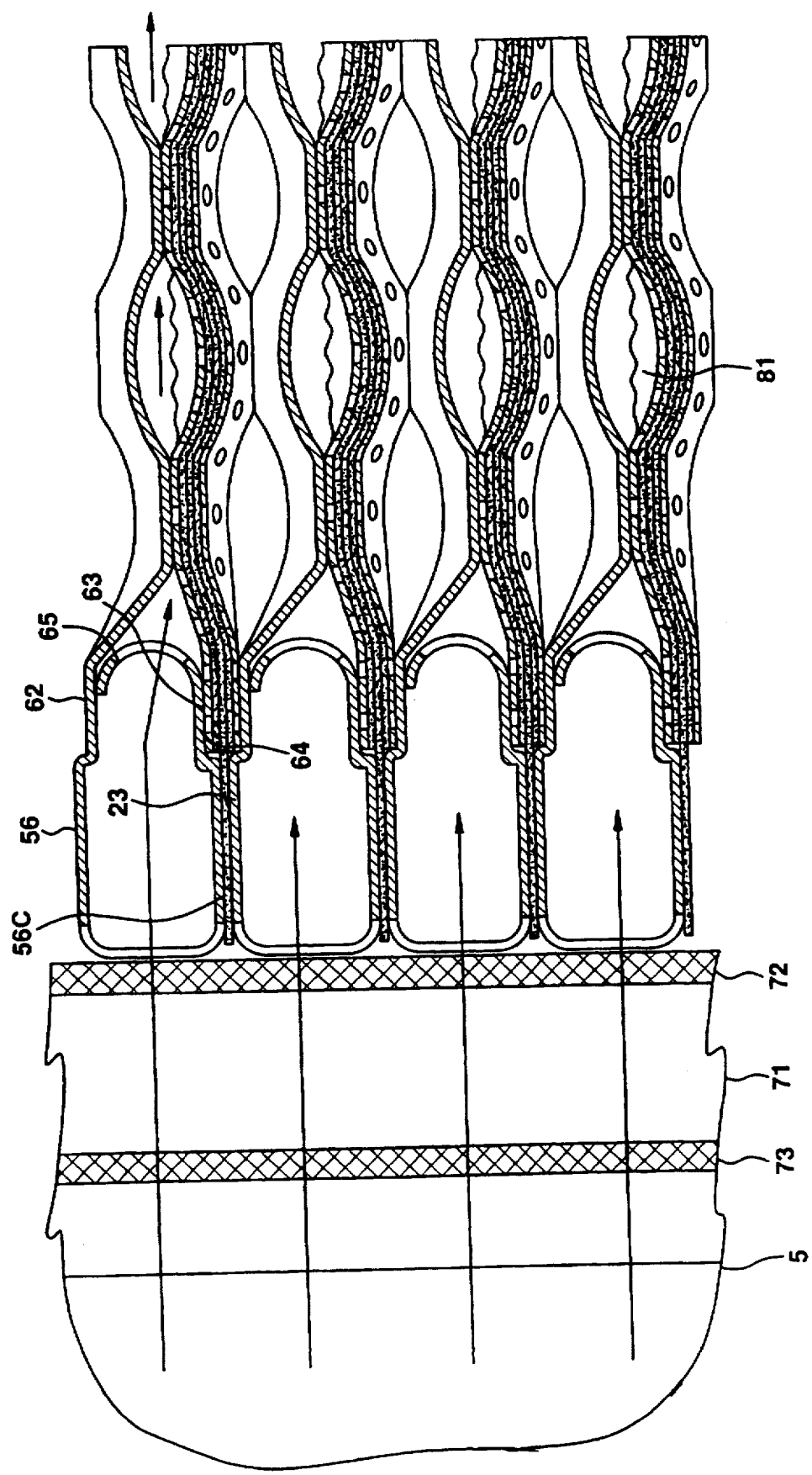
FIG. 5 shows a partial cross-section of the adjacent fuel cell sub-assemblies of FIG. 1 with separator plates having wet seals of a particular type, but also conforming to the wet seal areas of FIG. 4B.

FIG. 5 illustrates a cross section of the sub-assemblies of FIG. 1 at an end of the stack of sub-assemblies. More particularly, FIG. 5 shows the above-discussed chambers formed by the side areas 56 and flaps 56C of the separator plates 31 and 41.

As can be seen, the matrix 23 of each sub-assembly extends between and over the entire length of the chambers formed by the side areas and flaps of adjacent sub-assemblies. The anode and cathode current collectors 21 and 25 and electrodes 22 and 24, however, extend between the chambers, but only over a part of their length.

In this case, the side areas 56 of the separator plates are a modified form of that shown for the separator plate 51 of FIG. 4. In particular, the side area 56 of each plate is slightly recessed at its back end at 62. The flap 56C of each side area is also recessed at its forward end at 63 and then bent upward and around so as to abut the bottom of the recessed back end 62. The upturned end includes an aperture 65. The aperture 65 allows gas communication between the chamber and the central area of the plate, while the upturned end 64 enhances the sealing of the chamber formed by the respective flap.

FIG. 5 also illustrates the gas manifold 5 feeding the chambers formed by the end areas 56. A dielectric 71, bordered by sealing gaskets 72 and 73, abut the end walls of the chambers. The manifold 5 rests against the sealing gasket 73.

Also shown in FIG. 5, is an electrolyte slurry 81 deposited in the cavities formed by the dimples of the sub-assemblies 2 protruding in second or downward direction. The slurry 81 may be deposited at assembly from any number of various fluid metering/dispensing devices such that a predetermined inventory is delivered to the sub-assemblies as the electrolyte enters its liquid phase during initial stack conditioning. The absence of electrolyte from the sub-assemblies prior to this time facilitates the binder burnout and other in-situ conditioning of the sub-assemblies required of most fuel cell designs (molten carbonate in particular) because the porous electrodes are free to permit the vaporization and oxidation of the various binders and plasticizers used during manufacture and assembly. Furthermore, since the electrolyte does not reside within the porous sub-assemblies until after electrolyte melt in the case of molten carbonate cells, there is no change in the mechanical properties of the sub-assemblies at the time of melt.

Figure 6:
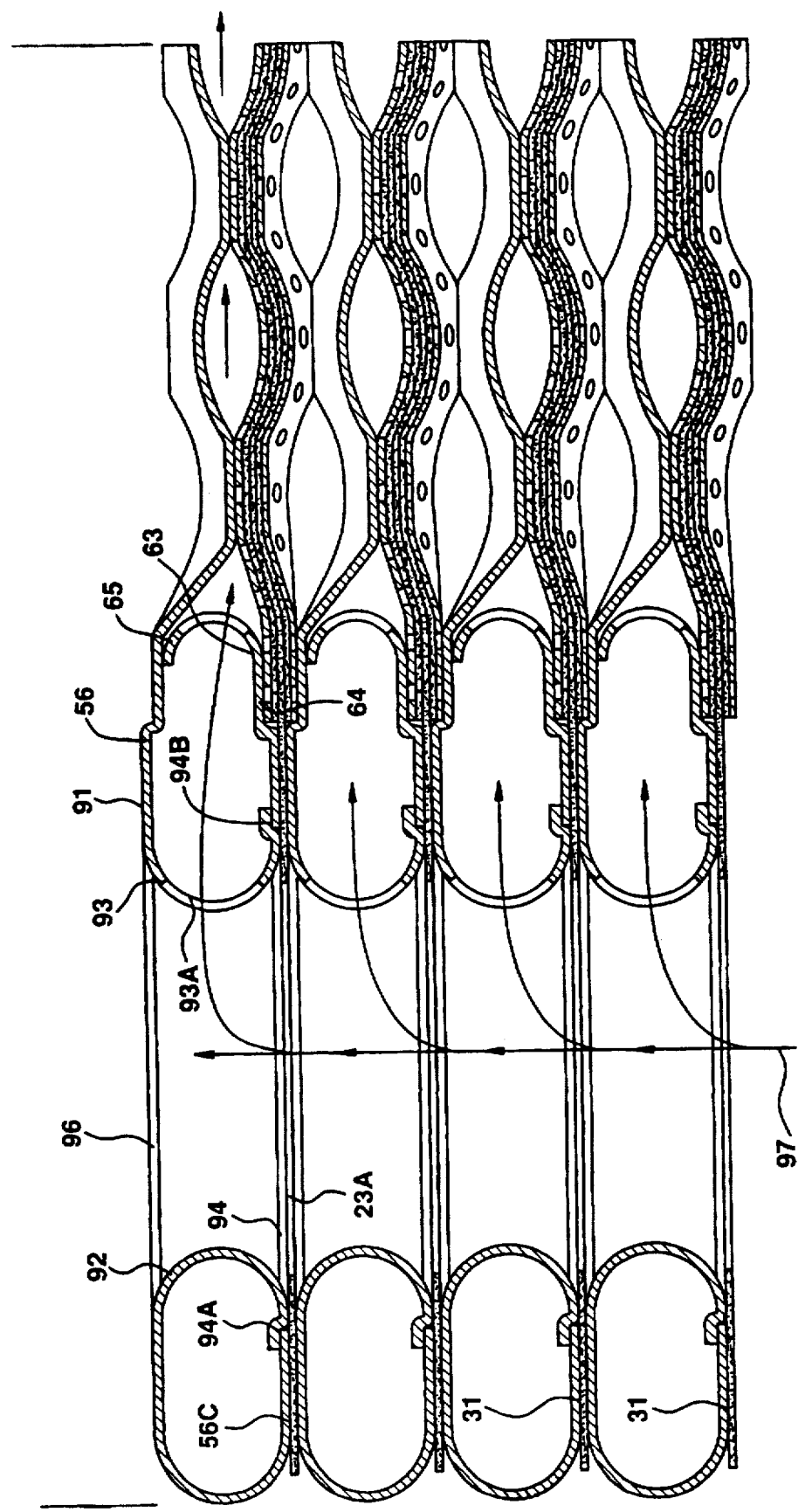
FIG. 6 shows a partial cross-section of adjacent fuel cell sub-assemblies of FIG. 1 with a separator plate having another type of wet seal, but also conforming to the wet seal areas of FIG. 4B.

FIG. 6 shows a further cross section of the stack sub-assemblies 2 of FIG. 1 in which the side areas of the separator plates 31 and 51 have been further modified from that shown for the separator plates of FIG. 5. In this case, the side areas have been adapted so that they themselves form manifolds for gas entry to and exit from the sub-assemblies 2.

In particular, the upper part 91 of the side area 56 has been lengthened and slotted to create forward and rear bendable parts 92 and 93. The flap 56C, in turn, has also been lengthened and provided with a central aperture 94 and with a forward end 64 as shown in FIG. 5. The forward bendable part 92 is bent down and around and abuts an edge 94A of the aperture 94. The rear bendable part 93 is also bent down and around and abuts an opposite edge 94B of the aperture 94. The rear bendable part also has an opening 93A in its bent section. The aperture 94 aligns with the opening 96 created when the parts 92 and 93 are bent into position. These, in turn, align with an opening 23A at the end of the matrix.

As can be appreciated, with this configuration of the separator plates, the ends 56 form manifolds for the delivery of gas to their respective fuel cell sub-assemblies. In particular, gas as shown at 97 can be introduced through the aligned apertures and openings 94 and 96 and will flow through the formed chambers and be conveyed to the sub-assemblies. As can be appreciated, at the opposite ends of the sub-assemblies, the ends 57 of the separator plates are similarly formed to provide exit manifolds for the gas introduced into the sub-assemblies. Likewise, the ends 54 and 55 of the separator plates of the sub-assemblies are also similarly formed to provide respective entry and exit gas manifolds.

In yet a further aspect of the present invention, each of the sub-assemblies 2 of FIG. 2 has been adapted to include a dual anode chamber having totally or partially isolated anode compartments 61A and 61B. This permits internal reforming of hydrocarbon gas in one of the two anode compartments, i.e., the one isolated from the electrolyte matrix, to form hydrogen rich fuel gas. This fuel gas can be then introduced into the second of the two anode compartments, i.e., the one communicating with the electrolyte matrix, to undergo electrochemical reaction to produce electricity.

In FIG. 2, the anode compartments 61A and 61B are created by including a gas barrier member 101 between the each separator plate 31 and 41 and its adjacent anode current collector 25. This segments the anode chamber 61 into the two compartments 61A and 61B, one adjacent the anode current collector 25 and the other adjacent the cavities of the downwardly extending dimples of the separator plate. These cavities are adapted to carry catalyst material, shown as pellets 102. The pellets 102 reform the hydrocarbon rich, e.g., methane, gas introduced into the compartments 61B to produce hydrogen rich gas for entry and electrochemical reaction in the compartments 61A.

The gas barrier member 101 may be formed in a variety of ways so as to be effective to isolate the catalyst pellets 102 from the electrolyte matrix 23. Two principal mechanisms are known to cause transport of electrolyte to the catalyst pellets. Liquid film creepage is known as a significant transportation mechanism while vapor phase transportation is also significant. Accordingly, the gas barrier member 101 can be comprised of nickel, which is known to resist wetting by the electrolyte, and thus would inhibit liquid film creepage.

More particularly, the member 101 may be a thin non-porous sheet of nickel which extends fully to the periphery of the electrodes and is selectively sealed about the edges. In this way, the hydrocarbon rich gas may be introduced into the reforming compartments 61B at a precise location and traverse the entire length of the sub-assembly free of vapor phase electrolyte and made to turn around within the wet-seal formed by the separator plates and then caused re-enter the compartments 61A.

The gas barrier member 101 may also be formed as a porous nickel sheet such that with the introduction of the hydrocarbon rich gas, and with the subsequent catalytic reforming reaction, the reformed gases are free to pass directly through the member 101 into the compartments 61A. The member 101 may range from thin solid nickel through which only hydrogen ions may pass, to thin porous nickel where the member functions simply as a barrier to liquid film creepage by virtue of the increased tortuosity.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. Apparatus comprising:

an electrolyte member;

an anode electrode;

a cathode electrode;

an anode current collector;

a cathode current collector;

said anode and cathode electrodes, said anode and cathode current collectors and said electrolyte member being sandwiched together in the sequence of anode current collector, anode electrode, electrolyte member, cathode electrode and cathode current collector to form a composite fuel cell sub-assembly;

said composite fuel cell sub-assembly having a plurality of rows of dimples, the rows of dimples extending through the thicknesses of the anode current collector, the anode electrode, the electrolyte member, the cathode electrode and the cathode current collector of said composite fuel cell sub-assembly, and the dimples in successive rows of dimples protruding in opposing directions from said composite fuel cell sub-assembly.

2. Apparatus in accordance with claim 1 wherein:

the successive rows of dimples are offset relative to each other.

3. Apparatus in accordance with claim 2 wherein:

the distance between the peaks of successive dimples in each row of dimples is equal to a given distance; and said offset between successive rows of dimples is equal to one-half said given distance.

4. Apparatus in accordance with claim 1 wherein:

each said dimple in said rows of dimples has a flat top.

* * * * *

UNITED STATES PATENT AND TRADEMARK OFFICE
CERTIFICATE OF CORRECTION

PATENT NO. : 5,795,665
DATED : August 18, 1998
INVENTOR(S) : Jeffrey Allen

It is certified that error appears in the above-identified patent and that said Letters Patent is hereby corrected as shown below:

Col. 8, line 9, delete "10".

Signed and Sealed this

Twenty-ninth Day of August, 2000

Attest:

Q. TODD DICKINSON

Attesting Officer

Director of Patents and Trademarks